(12) United States Patent
Iyoda

(10) Patent No.: US 6,196,578 B1
(45) Date of Patent: *Mar. 6, 2001

(54) ACTIVATION CONTROLLING APPARATUS FOR PASSIVE SAFETY DEVICE

(75) Inventor: Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/149,377

(22) Filed: Sep. 8, 1998

(30) Foreign Application Priority Data

Sep. 19, 1997 (JP) .................................................. 9-255133
Mar. 12, 1998 (JP) ................................................ 10-061446

(51) Int. Cl.[7] .................................................. B60R 21/32
(52) U.S. Cl. ........................................... 280/735; 701/45
(58) Field of Search ........................... 280/735; 180/282; 701/45, 46, 47; 340/436; 307/10.1

(56) References Cited

U.S. PATENT DOCUMENTS

| 5,014,810 | 5/1991 | Mattes et al. . | |
|---|---|---|---|
| 5,407,228 | 4/1995 | Shibata et al. | 280/735 |
| 5,496,979 | 3/1996 | Behr . | |
| 5,513,109 | * 4/1996 | Fujishima | 364/424.05 |
| 5,559,697 | 9/1996 | Wang . | |
| 5,668,720 | * 9/1997 | Takahashi et al. | 701/46 |
| 5,785,347 | 7/1998 | Adolph et al. | 280/735 |
| 5,815,393 | 9/1998 | Chae | 364/424.056 |
| 5,936,518 | * 8/1999 | Fukui et al. | 340/436 |
| 5,967,548 | * 10/1999 | Kozyreff | 280/735 |
| 5,969,599 | * 10/1999 | Wessels et al. | 340/436 |
| 5,978,722 | * 11/1999 | Takasuka et al. | 701/45 |
| 6,070,113 | * 5/2000 | White et al. | 701/45 |

FOREIGN PATENT DOCUMENTS

| 5-38998 | 2/1993 | (JP) . |
|---|---|---|
| 5-65706 | 8/1993 | (JP) . |
| 7-096816 | 4/1995 | (JP) . |
| 10-152014 | 6/1998 | (JP) . |

OTHER PUBLICATIONS

Copending U.S. application No. 08/962,386, filed Oct. 31, 1997.

* cited by examiner

Primary Examiner—J. J. Swann
Assistant Examiner—David R. Dunn
(74) Attorney, Agent, or Firm—Kenyon & Kenyon (57) ABSTRACT

In an activation controlling apparatus for passive safety device having a control circuit 20 for comparing a value obtained based on a measured value by floor sensor 32 with a threshold and for controlling activation of a passive safety device, a satellite sensor 30 for detecting whether an impact not less than a predetermined reference value is exerted on the vehicle, and a threshold-change-pattern altering section 42 for lowering the threshold when the satellite sensor detects the impact not less than the reference value, the apparatus is arranged to determine whether the value obtained based on the measured value by the floor sensor is smaller than a predetermined value, when the satellite sensor detects the impact not less than the reference value, and the apparatus has a threshold-change-pattern alteration disabling section 43 for disabling the threshold-change-pattern altering section from lowering the threshold when the value obtained based on the measured value is determined to be smaller than the predetermined value.

11 Claims, 8 Drawing Sheets

ACTIVATION CONTROLLING APPARATUS FOR PASSIVE SAFETY DEVICE

BACKGROUND OF THE INVENTION

1. Field of the Invention

The present invention relates to an activation controlling apparatus for passive safety device that is arranged to control activation of such a passive safety device as an air bag system for protecting the occupant in a vehicle in the event of a crash thereof.

2. Related Background Art

In the conventional activation controlling apparatus for controlling the activation of the passive safety device, the impact exerted on the vehicle is normally detected as deceleration by an acceleration sensor set on the floor tunnel, an arithmetic value is calculated based on the deceleration thus detected, the arithmetic value is compared with a preset threshold, and firing of a squib is controlled based on the comparison result.

SUMMARY OF THE INVENTION

Figure 8A:
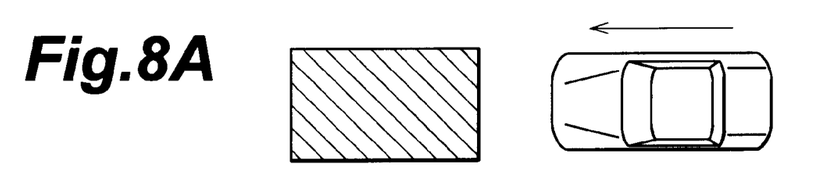
FIG. 8A shows frontal crash.
Figure 8B:
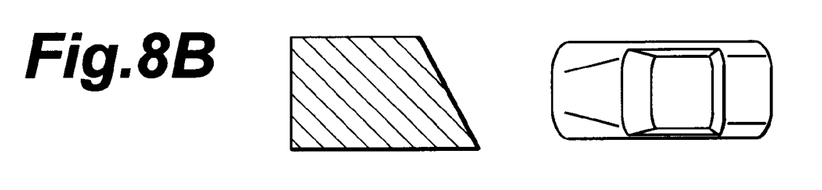
FIG. 8B shows oblique crash.
Figure 8C:
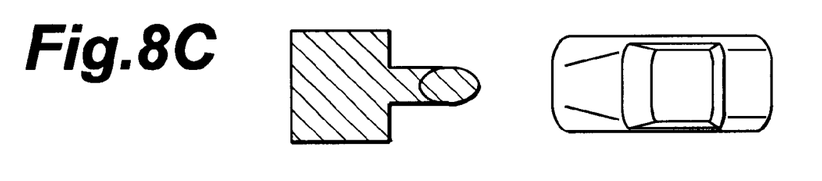
FIG. 8C shows pole crash.
Figure 8D:
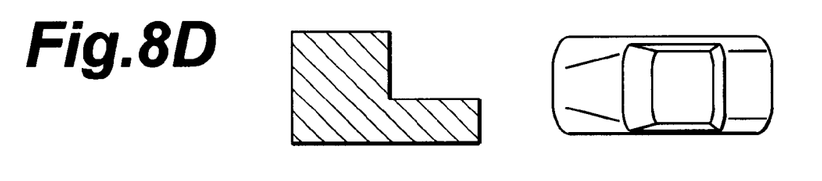
FIG. 8D shows offset crash.
Figure 8E:
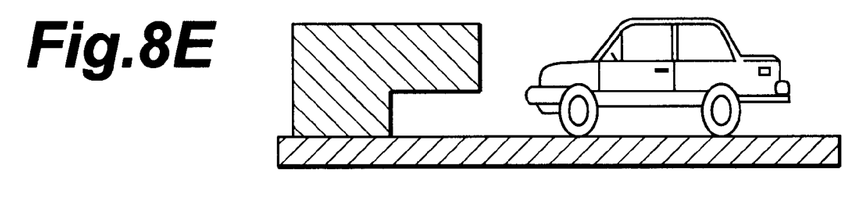
FIG. 8E shows under-ride crash.

Crash modes of vehicle are classified under the frontal crash as shown in FIG. 8A, oblique crash as shown in FIG. 8B, pole crash as shown in FIG. 8C, offset crash as shown in FIG. 8D, under-ride crash as shown in FIG. 8E, and so on, depending upon ways of crash, directions of crash, types of the object against which the vehicle clashes, and so on. On the occasion of the frontal crash among them, the vehicle receives the impact due to the crash by the two side members left and right, so that great deceleration appears on the floor tunnel equipped with the floor sensor, within a predetermined time after the crash. In contrast with it, on the occasion of the crashes except for the frontal crash, the way of receiving the impact is different from the above, and the deceleration is not so large on the floor tunnel in the predetermined time after the crash.

It is thus conceivable that satellite sensors are located in the front part of the vehicle and the activation controlling apparatus for passive safety device is arranged to perform determination on activation of the passive safety device using a lowered threshold when the satellite sensors detect the impact equal to or greater than a reference value.

Figure 8F:
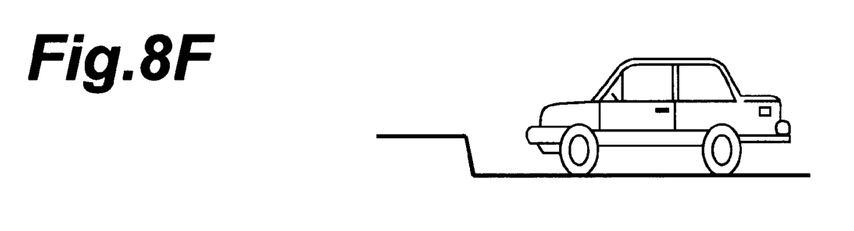
FIG. 8F shows running on rough road.

The satellite sensors might detect the impact not less than the reference value upon reception of local impact, however, in the cases except for the car crash; for example, in the case where a tow hook interferes with a level difference or the like on the road when the car runs on the rough road as shown in FIG. 8F. In such cases the threshold is desired to be maintained in the high level.

An object of the present invention is to provide an activation controlling apparatus for passive safety device that can accurately prevent activation of the passive safety device during a non-crash period of vehicle.

An activation controlling apparatus for passive safety device according to the present invention is an activation controlling apparatus for passive safety device comprising: impact measuring means mounted at a predetermined position in a vehicle, for measuring an impact exerted on the vehicle; activation controlling means for comparing a value obtained based on a measured value by the impact measuring means with a threshold and for controlling activation of a passive safety device, based on a result of the comparison; impact detecting means mounted ahead of the impact measuring means in the vehicle, for detecting whether an impact not less than a predetermined reference value is exerted on the vehicle; and threshold altering means for lowering the threshold when the impact detecting means detects the impact not less than the reference value, the activation controlling apparatus for passive safety device comprising: determining means for determining whether the value obtained based on the measured value by the impact measuring means is smaller than a predetermined value, when the impact detecting means detects the impact not less than the reference value; and threshold alteration disabling means for disabling the threshold altering means from lowering the threshold when the determining means determines that the value obtained based on the measured value is smaller than the predetermined value.

In this activation controlling apparatus, when the impact detecting means detects an impact not less than the reference value, exerted on the vehicle, the determining means determines whether a value obtained based on a measured value by the impact measuring means is smaller than the predetermined value; when it is determined that the value obtained based on the measured value is smaller than the predetermined value, the threshold alteration disabling means disables the threshold altering means from lowering the threshold. The passive safety device can be prevented well from being activated during the non-crash period accordingly.

Another activation controlling apparatus for passive safety device preferably comprises: impact measuring means mounted at a predetermined position in a vehicle, for measuring an impact exerted on the vehicle; activation controlling means for comparing a value obtained based on a measured value by the impact measuring means with a threshold and for controlling activation of a passive safety device, based on a result of the comparison; impact detecting means mounted ahead of the impact measuring means in the vehicle, for detecting an impact exerted on the vehicle; and threshold setting means for setting the threshold on the basis of the value obtained based on the measured value by the impact measuring means and a value obtained based on a detected value by the impact detecting means.

In this activation controlling apparatus, the threshold setting means sets the threshold for controlling activation of the passive safety device on the basis of the value obtained based on the measured value by the impact measuring means and the value obtained based on the detected value by the impact detecting means. The prevention of activation of the passive safety device can be accurately carried out during the non-crash period accordingly.

More preferably, the threshold setting means comprises threshold altering means for altering the threshold by a predetermined amount when the impact detecting means detects an impact not less than a reference value, and threshold-alteration-amount adjusting means for adjusting the predetermined amount according to the value based on the measured value by the impact measuring means.

In this activation controlling apparatus, the threshold-alteration-amount adjusting means adjusts the predetermined amount of the threshold altered by the threshold altering means in accordance with the value based on the measured value by the impact measuring means, so that the determination on the crash can be performed using the threshold of an appropriate value and the prevention of activation of the passive safety device can be accurately performed during the non-crash period.

More preferably, the threshold-alteration-amount adjusting means has determining means for determining whether the value based on the measured value by the impact measuring means is smaller than a predetermined value, and wherein the threshold-alteration-amount adjusting means sets the predetermined amount to zero when the determining means determines that the value based on the measured value is smaller than the predetermined value.

In this activation controlling apparatus, when the determining means determines that the value based on the measured value by the impact measuring means is smaller than the predetermined value, the predetermined amount of the threshold altered by the threshold altering means is set to zero; therefore, the determination on the crash can be performed with the high threshold and the prevention of activation of the passive safety device can be accurately carried out during the non-crash period.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
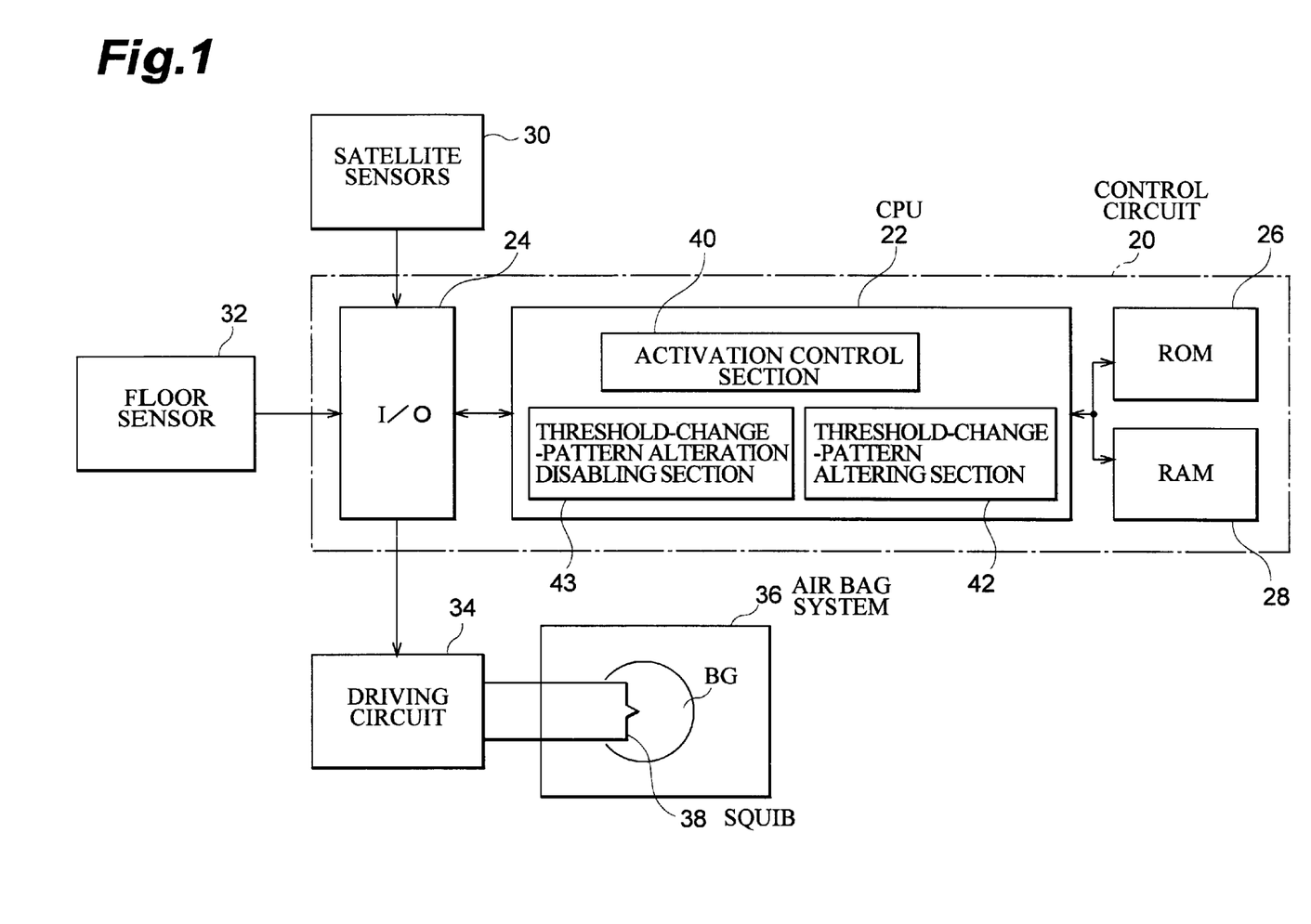
FIG. 1 is a block diagram to show an activation controlling apparatus for passive safety device as an embodiment of the present invention.
Figure 2:
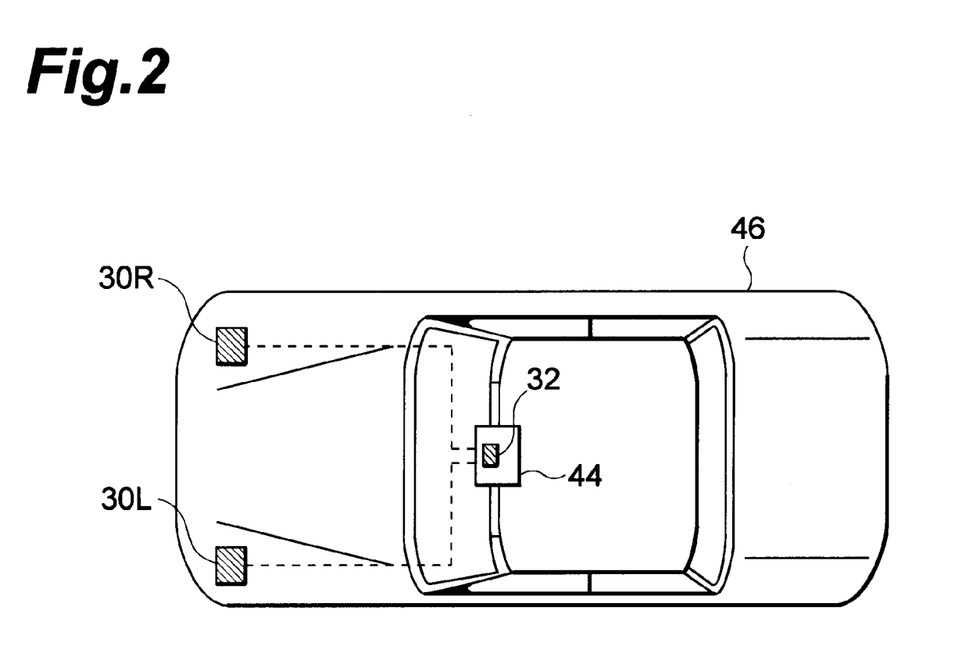
FIG. 2 is an explanatory drawing to show installation locations of satellite sensors 30 and floor sensor 32.

The activation controlling apparatus for passive safety device as an embodiment of the present invention will be described with reference to the drawings. FIG. 1 is a block diagram to show the activation controlling apparatus for passive safety device using the satellite sensors and FIG. 2 is an explanatory drawing to show installation locations of the satellite sensors 30 and floor sensor 32 in FIG. 1. In the following description, reference numeral 20 designates a control circuit, 22 a central processing unit (CPU), 24 an I/O circuit, 26 ROM, 28 RAM, 30 satellite sensors, 32 a floor sensor, 34 a driving circuit, 36 an air bag system, 38 a squib, 40 an activation controlling section, 42 a threshold-change-pattern altering section, 43 a threshold-change-pattern alteration disabling section, 44 an electronic control unit (ECU), 46 a vehicle, 70 a threshold setting section, 72 a threshold alteration amount adjusting section, 74 a threshold altering section, and 76 a determining section.

This activation controlling apparatus for passive safety device is an apparatus for controlling activation of the air bag system 36, which is a kind of passive safety device, and mainly has the control circuit 20, satellite sensors (impact detecting means) 30, floor sensor (impact measuring means) 32, and driving circuit 34, as shown in FIG. 1.

Among the components, the satellite sensors 30 are mechanical sensors for detecting whether an impact not less than a predetermined reference value is exerted on the vehicle 46; specifically, an internal switch thereof is turned on when the deceleration not less than a predetermined reference value is applied to the vehicle 46, and the sensor outputs an on signal. The floor sensor 32 is a so-called acceleration sensor for measuring the impact exerted on the vehicle 46; specifically, it measures the deceleration exerted in the longitudinal direction on the vehicle 46 on occasion and outputs a signal indicating the measured value.

The control circuit 20 has the CPU 22, read only memory (ROM) 26, random access memory (RAM) 28, and input/output circuit (I/O circuit) 24, and the components are connected through bus. Among them, the CPU 22 performs various processing operations of activation control according to programs etc. stored in the ROM 26. The RAM 28 is a memory for storing data obtained by signals from the respective sensors 30, 32 and arithmetic results calculated based thereon by the CPU 22. The I/O circuit 24 is a circuit for receiving the signals from the sensors 30, 32 and for outputting an activation signal to the driving circuit 34.

According to the aforementioned programs, the CPU 22 functions as the activation controlling section 40 for comparing a value obtained based on the detection result of the floor sensor 32 with a predetermined threshold and controlling the activation of the air bag system 36, based on the result of the comparison, as the threshold-change-pattern altering section 42 for altering a change pattern of the threshold to another change pattern when the satellite sensors 30 detect the impact not less than the predetermined reference value, and as the threshold-change-pattern alteration disabling section 43 for disabling the threshold-change-pattern altering section 42 from altering the change pattern of threshold when the satellite sensors 30 detect the impact not less than the predetermined reference value and when the value obtained based on the detection result of the floor sensor 32 is smaller than a predetermined value.

The driving circuit 34 is a circuit for powering and in turn firing the squib 38 in the air bag system 36 in response to the activation signal from the control circuit 20. In addition to the squib 38 being a firing device, the air bag system 36 also includes a gas generating agent (not illustrated) to be fired by the squib 38, and a bag BG to be inflated by gas generated.

The control circuit 20, floor sensor 32, and driving circuit 34 out of these components are housed in the ECU 44 shown in FIG. 2, which is mounted on the floor tunnel located near the center in the vehicle 46. The satellite sensors 30 are installed in the front part of the vehicle 46 right ahead and left ahead of the floor sensor 32 in the ECU 44, as shown in FIG. 2.

Described below are the operations of the satellite sensors 30, floor sensor 32, and CPU 22 in the event of a crash of the vehicle.

Figure 3:
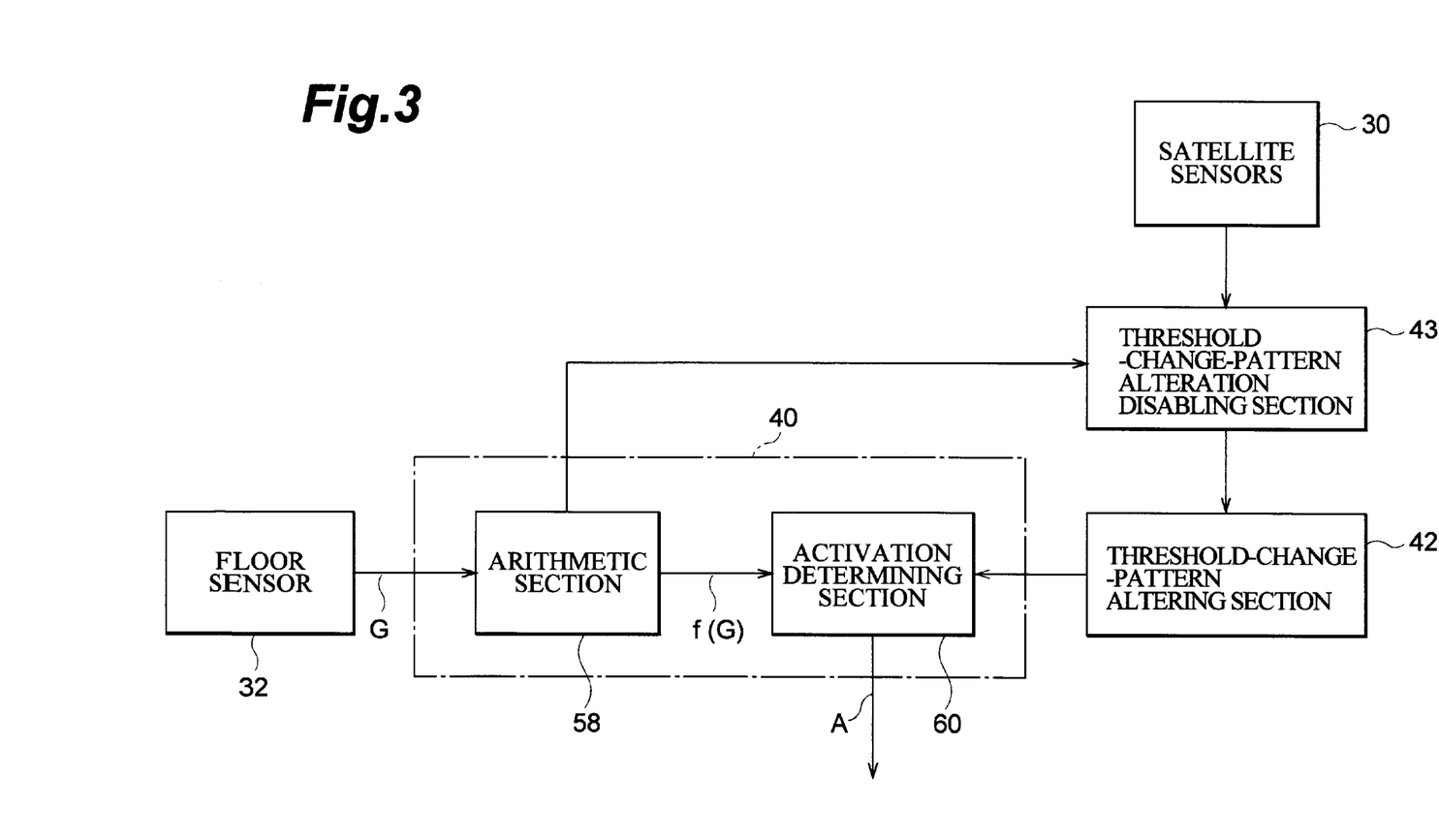
FIG. 3 is a diagram for explaining alteration of threshold change pattern.

FIG. 3 is an explanatory drawing for explaining the operations of the satellite sensors 30, floor sensor 32, and CPU 22 shown in FIG. 1. As shown in FIG. 3, the activation controlling section 40 in the CPU 22 has an arithmetic section 58 and an activation determining section 60.

In FIG. 3, the floor sensor 32 measures the deceleration G applied in the longitudinal direction on the vehicle 46 on occasion and outputs a signal indicating the measured value G. The arithmetic section 58 of the activation controlling section 40 executes a predetermined arithmetic with the measured value G outputted from the floor sensor 32 to obtain an arithmetic value f(G). The arithmetic value f(G) is either one of a speed (which is a value obtained by once integrating the deceleration G with respect to the time), a moving distance (which is a value obtained by twice integrating the deceleration G with respect to the time), a movement average (which is a value obtained by integrating the deceleration G for a fixed time), an intensity of a specific frequency component of the deceleration G, a resultant component of vectors indicating the longitudinal and lateral decelerations G of the vehicle, and so on. The deceleration G itself (i.e., the measured value G itself) can also be used as the arithmetic value f(G). In this case, it can be understood that the arithmetic section executes an arithmetic to multiply the measured value G by "1" as a coefficient.

Next, the activation determining section 60 of the activation controlling section 40 compares the arithmetic value f(G) obtained in the arithmetic section 58 with the threshold T. In this case, the threshold T is not a constant value, but values varying according to the speed v of an object (for example, the occupant) assumed to be unfixed in the vehicle 46.

Here, the speed v of the object assumed to be unfixed in the vehicle 46 (which will be referred to as an unfixed object) is a value obtained by once integrating the deceleration G with respect to the time t. When the deceleration G is applied to the vehicle running forward, the unfixed object in the vehicle is drawn forwardly by inertial force so as to be accelerated forwardly with respect to the vehicle. The relative speed v of the unfixed object to the vehicle at this time can be obtained by once integrating the deceleration G. This speed v is also calculated by the aforementioned arithmetic section 58 when the arithmetic value f(G) is obtained from the deceleration G.

Figure 4A:
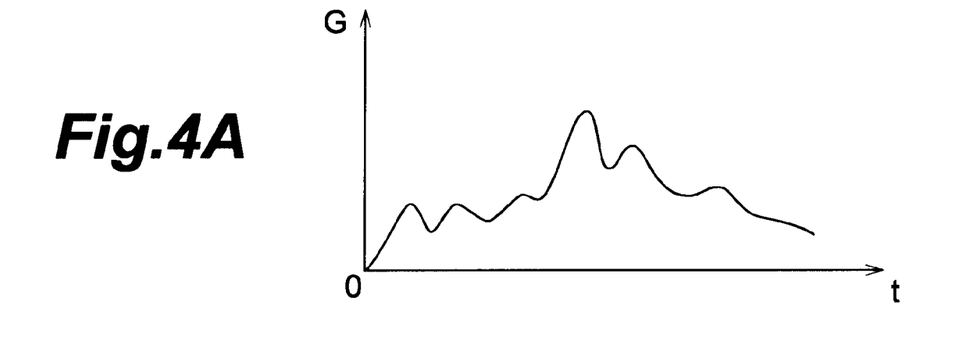
FIG. 4A and FIG. 4B are characteristic diagrams to show examples of change in deceleration G or speed v of an unfixed object against time t.
Figure 4B:
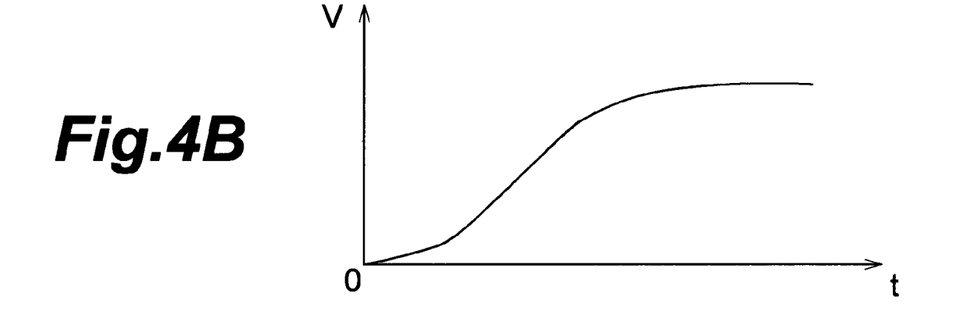
Figure 4C:
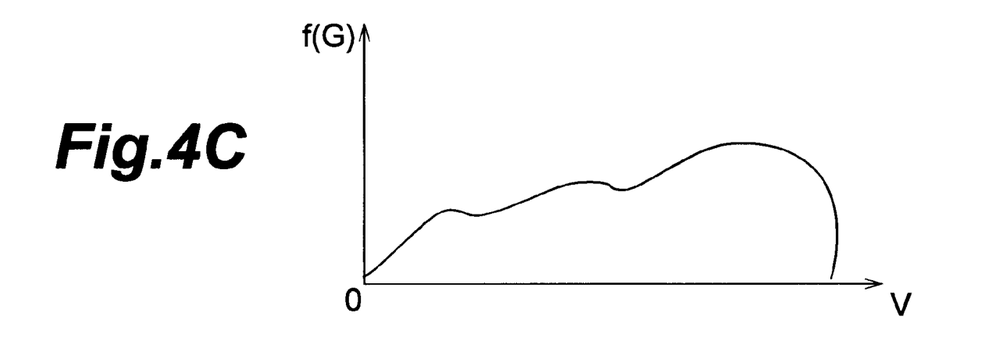
FIG. 4C is a characteristic diagram to show an example of change in arithmetic value f(G) against speed v.

FIG. 4A, FIG. 4B, and FIG. 4C are characteristic diagrams to show an example of changes in the deceleration G and the speed v of the unfixed object against the time t and an example of change in the arithmetic value f(G) against speed v. FIG. 4A shows the change in the deceleration G, FIG. 4B the change in the speed v, and FIG. 4C the change in the arithmetic value f(G). In FIG. 4A or FIG. 4B, the ordinate represents the deceleration G or the speed v, respectively, and the abscissa the time t. In FIG. 4C, the ordinate indicates the arithmetic value f(G) and the abscissa the speed v.

In the example shown in FIG. 4A and FIG. 4B, the deceleration G rapidly changes with change in the time, whereas the speed v obtained by once integrating the deceleration G monotonically increases with change in the time. The arithmetic value f(G) obtained from the deceleration G by the predetermined arithmetic changes as shown in FIG. 4C with change in the speed v shown in FIG. 4B.

Figure 5A:
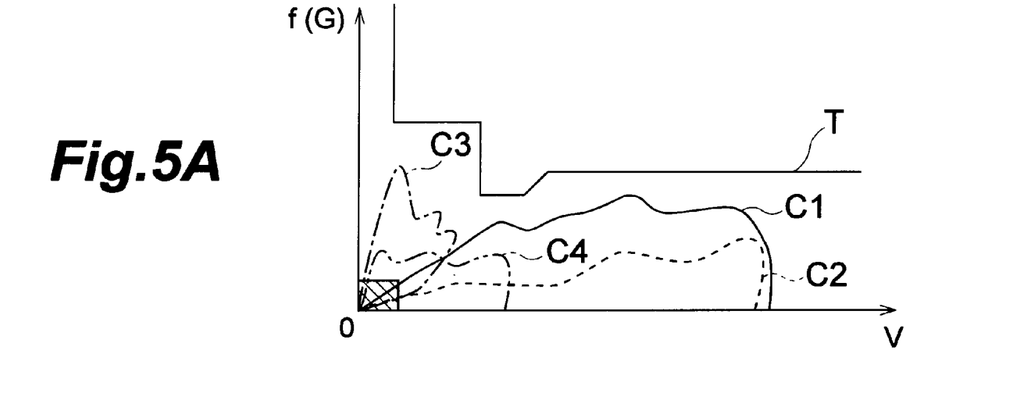
FIG. 5A and FIG. 5B are diagrams to show examples of change pattern of threshold T against speed v of the unfixed object and an area where the alteration of threshold is not carried out, used in the embodiment of the present invention.
Figure 5B:
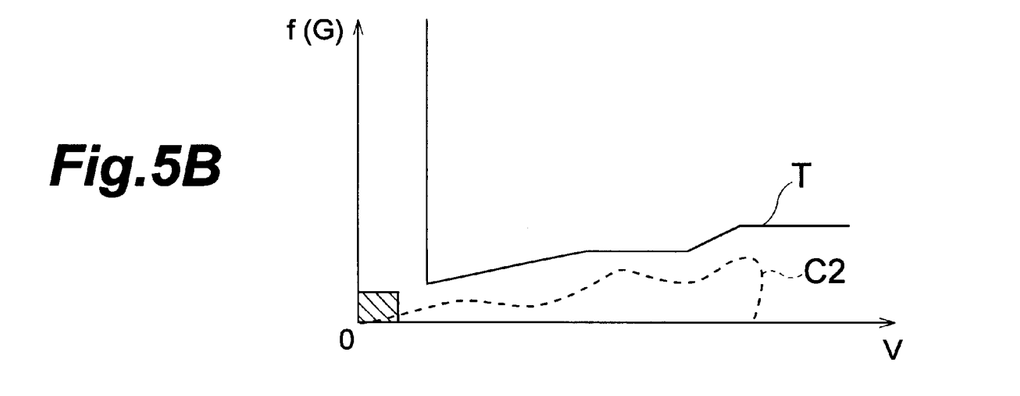

FIG. 5A and FIG. 5B are characteristic diagrams to show an example of change patterns of the threshold T against speed v of the unfixed object, used in this embodiment. In FIG. 5A and FIG. 5B, the ordinate represents the arithmetic value f(G) obtained in the arithmetic section 58 and the abscissa the speed v of the unfixed object in the vehicle. As shown in FIG. 5A and FIG. 5B, the threshold T varies according to the speed v of the unfixed object in the vehicle. The difference between FIG. 5A and FIG. 5B will be described hereinafter.

The activation determining section 60 is preliminarily provided with the change patterns of the threshold T against speed v as shown in FIG. 5A and FIG. 5B. Then the activation determining section 60 gains a threshold T according to a speed v obtained by the arithmetic section 58 from the change patterns of the threshold T and compares the threshold T with the arithmetic value f(G) obtained in the arithmetic section 58. If the comparison finds that the arithmetic value f(G) is over the threshold T, the activation determining section 60 outputs an activation signal A to the driving circuit 34 shown in FIG. 1. This causes the driving circuit 34 to power the squib 38 so as to activate the air bag system 36, and the squib 38 fires the gas generating agent (not illustrated) to inflate the bag BG. The activation determining section 60 outputs the activation signal A when the arithmetic value f(G) becomes over the threshold T within a predetermined time (with the on signal being kept) after the satellite sensors 30 have outputted the on signal.

On the other hand, the satellite sensors 30 output the on signal with the internal switch thereof being flipped on when the deceleration not less than the predetermined reference value is applied to the vehicle 46. Here, this reference value is set to a value greater than values of impact detected at the installation places of the satellite sensors 30 when the impact too weak to activate the air bag system is exerted on the vehicle 46 in the event of the frontal crash and while the vehicle 46 is running on a rough road. Therefore, the satellite sensors 30 are arranged to prevent the internal switches thereof at least from being turned on when the vehicle 46 receives only the impact too weak to activate the air bag system even in the event of the frontal crash and while the vehicle 46 is running on the rough road. The internal switches, however, could be turned on to output the on signal even during the non-crash period of the vehicle 46 in the event where the tow hook interferes.

The on signal outputted from the satellite sensors 30 is supplied to the threshold-change-pattern alteration disabling section 43 as shown in FIG. 3. When receiving the on signal from the satellite sensors 30, the threshold-change-pattern alteration disabling section 43 determines whether the arithmetic value f(G) supplied from the arithmetic section 58 is smaller than a predetermined value. If smaller, the disabling section ignores the on signal supplied from the satellite sensors 30 and disables the threshold-change-pattern altering section 42 from altering the change pattern of threshold.

On the other hand, when the on signal is supplied from the satellite sensors 30 and when the arithmetic value f(G) supplied from the arithmetic section 58 is not smaller than the predetermined value, the disabling section 43 outputs a control signal indicating execution of alteration of threshold pattern to the threshold-change-pattern altering section 42. The threshold-change-pattern altering section 42 alters the change pattern of threshold T against speed v to another change pattern in accordance with the control signal from the threshold-change-pattern alteration disabling section 43. Specifically, the threshold-change-pattern altering section 42 alters the change pattern of threshold T in the activation determining section 60 from the change pattern shown in FIG. 5A to the change pattern shown in FIG. 5B.

The hatched areas in FIG. 5A and FIG. 5B represent the case where the internal switch of the satellite sensors 30 is turned on to output the on signal because of a local impact, for example, in the event of interference of the tow hook, though the vehicle 46 is in a non-crash state. In this area the deceleration G detected by the floor sensor 32 is very small. The value of arithmetic value f(G) is also small. Therefore, the vehicle 46 can be determined to be in the non-crash state. The disabling section 43 thus ignores the on signal from the satellite sensors 30 and disables the alteration of change pattern of threshold by the altering section 42.

In FIG. 5A and FIG. 5B, C1 to C4 are curves indicating changes of the arithmetic value f(G) against speed v of the unfixed object. The curve C1 is a curve to show an example of change in the arithmetic value f(G) in the case where the impact too weak to activate the air bag system is exerted on the vehicle 46 in the event of the frontal crash, the curve C2 is a curve to show an example of change in the arithmetic value f(G) in the case where the impact too weak to activate the air bag system is exerted on the vehicle 46 in the event of a crash except for the frontal crash, and the curves C3, C4 are curves each showing an example of change in the arithmetic value f(G) obtained during running on the rough road. Since it is a matter of course that the air bag system does not have to be activated while the vehicle is running on the rough road, either of the curves C1 to C4 shows the change of the arithmetic value f(G) against speed v in the case where the air bag system does not have to be activated.

Therefore, the threshold T used in the determination on the activation of the air bag system (i.e., in the comparison with the arithmetic value f(G)) needs to be set to be greater than the all curves of these C1 to C4. Although the threshold needs to be set greater than these curves, it should better be set as small as possible in order to achieve earlier determination on the activation of the air bag system. For obtaining the change pattern of the threshold T in FIG. 5A, first, a plurality of curves are drawn to indicate changes in the arithmetic value f(G) in the cases where the air bag system need not be activated, and then such a pattern is obtained that values are greater than these curves but as close to these curves as possible. Specifically, an envelope is obtained for these curves and it is used as a change pattern of threshold T.

On the other hand, the satellite sensors 30 do not output the on signal when the impact too weak to activate the air bag system is exerted on the vehicle 46 in the event of the frontal crash or while the vehicle 46 is running on the rough road, as described previously. After the satellite sensors 30 output the on signal, consideration does not have to be given to the case where the impact too weak to activate the air bag system is exerted on the vehicle 46 in the event of the frontal crash and the case where the vehicle 46 is running on the rough road accordingly.

For obtaining the change pattern of threshold T shown in FIG. 5B, the change pattern is obtained by excluding the all cases where the impact too weak to activate the air bag system is exerted in the event of the frontal crash, as indicated by the curve C1, and where the vehicle 46 is running on the rough road, as indicated by the curves C3, C4. Specifically, first, plural curves are drawn to indicate changes in the arithmetic value f(G) where the impact too weak to activate the air bag system is exerted in the event of crashes except for the frontal crash, as indicated by the curve C2, and thereafter such a pattern is obtained that values are greater than these curves but as close to these curves as possible, in the same manner as in the case of FIG. 5A. Specifically, an envelope for these curves is obtained and it is used as a change pattern of the threshold T.

In general, the floor sensor 32 is more likely to detect the impact (i.e., the deceleration G) in the predetermined time after the crash (i.e., in the initial stage of crash) in the event of the frontal crash than in the event of the crashes except for the frontal crash. The floor sensor is also relatively more likely to detect the impact during running on the rough road. Because of this property, the arithmetic values (i.e., the curve C2) obtained from the detection results of the floor sensor 32 in the event of the crashes except for the frontal crash are generally smaller than those (i.e., the curves C1, C3, C4) in the event of the frontal crash and in the event during running on the rough road. As for the change pattern of threshold T, the change pattern shown in FIG. 5B is generally smaller than the change pattern shown in FIG. 5A.

The threshold-change-pattern altering section 42 switches the change patterns of threshold T shown in FIG. 5A and FIG. 5B, obtained as described above, from one to another, using the control signal from the threshold-change-pattern alteration disabling section 43 as a trigger, as described above. Consequently, the activation determining section 60 of the activation controlling section 40 compares the arithmetic value f(G) with the threshold T obtained from the change pattern of threshold T shown in FIG. 5A before the threshold-change-pattern alteration disabling section 43 outputs the control signal; after the threshold-change-pattern alteration disabling section 43 outputs the control signal, the activation determining section 60 compares the arithmetic value f(G) with the threshold obtained from the change pattern of threshold T shown in FIG. 5B.

In the activation controlling apparatus for passive safety device according to this embodiment, when the on signal is supplied from the satellite sensors 30 and when the arithmetic value f(G) supplied from the arithmetic section 58 is smaller than the predetermined value, the threshold-change-pattern alteration disabling section 43 ignores the on signal supplied from the satellite sensors 30 and disables the alteration of change pattern of threshold by the threshold-change-pattern altering section 42. Accordingly, the activation of the air bag system can be prevented in case where the internal switch of the satellite sensors 30 is turned on though the vehicle 46 is in the non-crash state, for example, in the event where the tow hook interferes.

Figure 6:
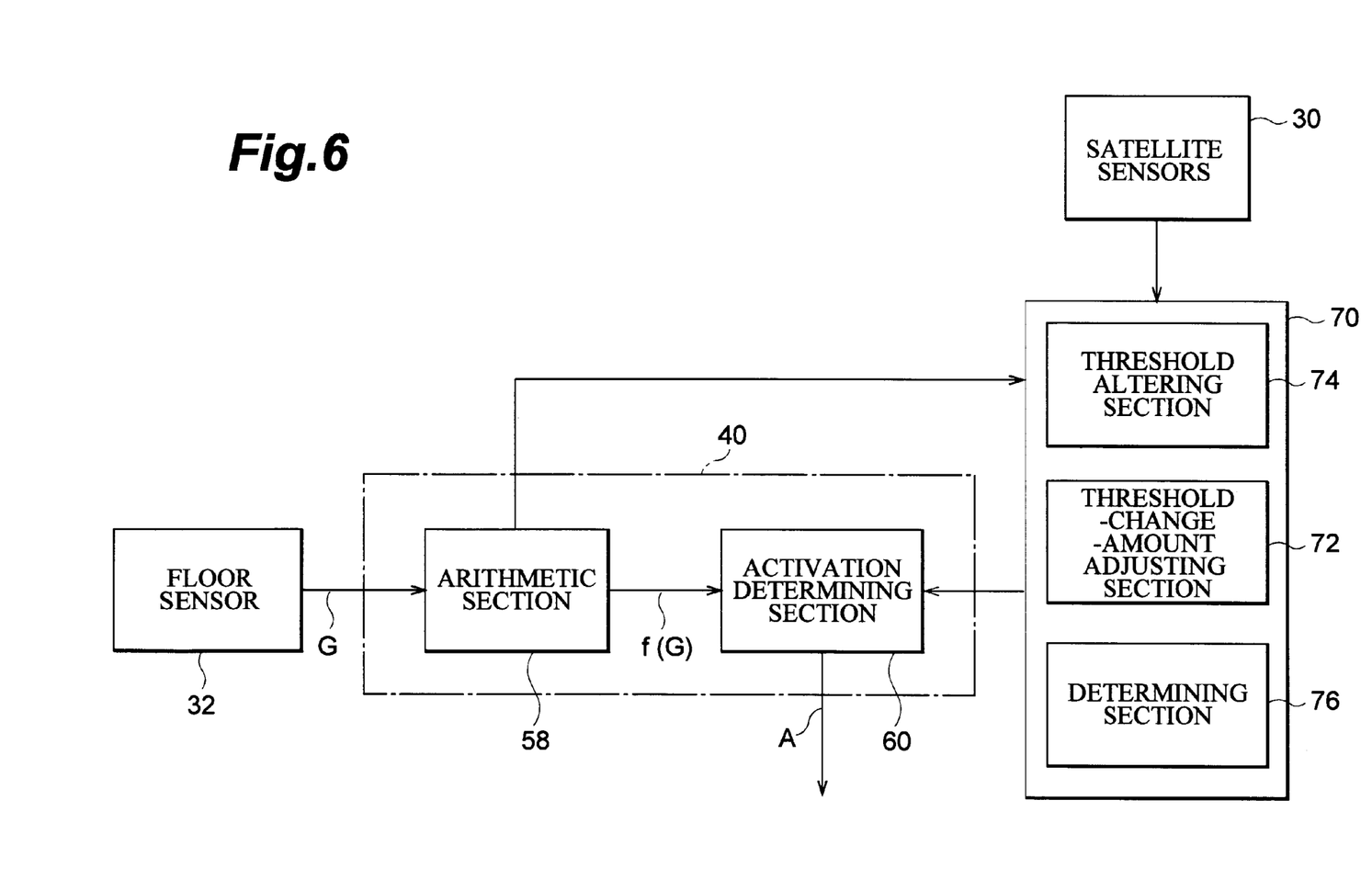
FIG. 6 is a diagram for explaining a modification of the alteration of threshold change pattern.

In the above-stated embodiment, when the satellite sensors 30 output the on signal and when the arithmetic value f(G) based on the measured value by the floor sensor 32 is smaller than the predetermined value, the alteration of change pattern of threshold is disabled; however, without having to be limited to this, the threshold may be set based on the values detected by the satellite sensors 30 and the floor sensor 32. In this case, as shown in FIG. 6, the apparatus is provided with threshold setting section 70 in place of the threshold-change-pattern altering section 42 and threshold-change-pattern alteration disabling section 43 shown in FIG. 3 and the threshold setting section 70 is arranged to receive the on signal outputted from the satellite sensors 30 and the arithmetic value f(G) outputted from the arithmetic section 58.

When receiving the on signal from the satellite sensors 30, the threshold setting section 70 sets the threshold, used in the determination on the activation of the air bag system 36 in the activation determining section 60, based on the arithmetic value f(G) supplied from the arithmetic section 58. Describing in more detail, threshold-alteration-amount adjusting section 72 of the threshold setting section 70 determines an alteration amount of threshold used for the determination on the activation of the air bag system 36, based on the arithmetic value f(G) outputted from the arithmetic section 58. Threshold altering section 74 sets a new threshold by altering the pre-stored threshold by the alteration amount determined by the threshold-alteration-amount adjusting section 72. In this case, the threshold-alteration-amount adjusting section 72 can set a smaller alteration amount of threshold, i.e., a smaller decrease amount of threshold with small arithmetic values f(G) than with large arithmetic values.

Determining section 76 determines whether the arithmetic value f(G) outputted from the arithmetic section 58 is smaller than a predetermined value. When it is determined to be smaller, the alteration amount of threshold determined by the threshold-alteration-amount adjusting section 72 is set to zero. The activation determining section 60 of the activation controlling section 40 executes the determination on the activation of the air bag system 36, based on the threshold altered by the threshold altering section 74 of the threshold setting section 70.

In the case where the satellite sensors 30 are electronic satellite sensors and where they output a signal based on a level of detected impact, it becomes possible to set a smaller decrease amount of threshold when the impact detected by the satellite sensors is small than when it is large, and also possible to adjust this decrease amount according to a value of the arithmetic value f(G) outputted from the arithmetic section 58.

Figure 7A:
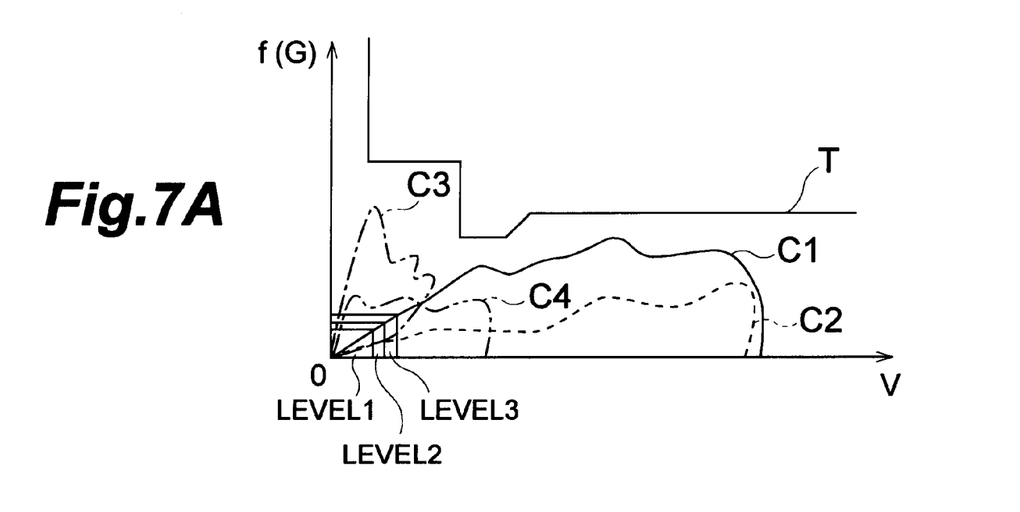
FIG. 7A and FIG. 7B are diagrams to show the examples of change pattern of threshold T against speed v of the unfixed object and a modification of the area where the alteration of threshold is not carried out.
Figure 7B:
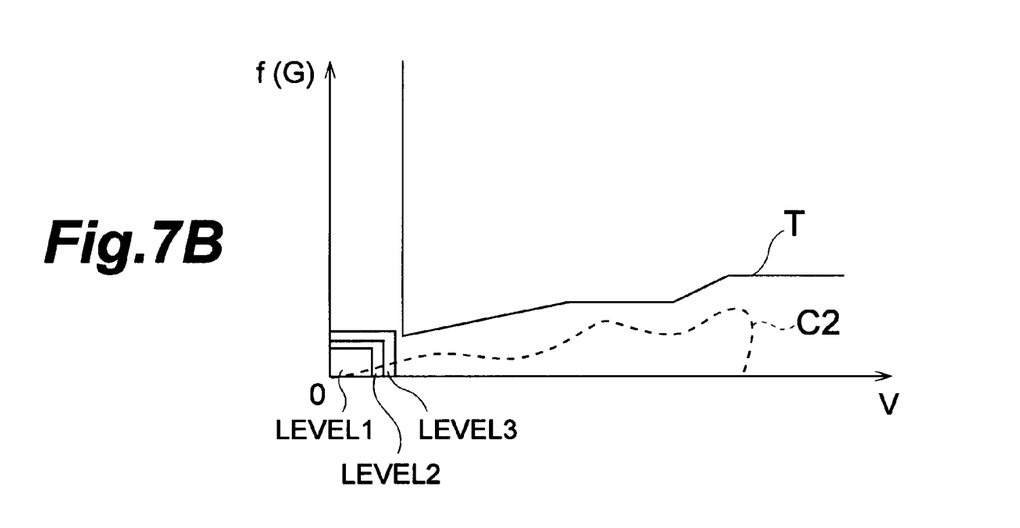

In the above-described embodiment the mechanical satellite sensors 30 are used to output the on signal when the deceleration not less than the predetermined reference value is exerted on the vehicle 46, but the electronic satellite sensors may also be used to output a signal based on a level of detected impact. In this case, the apparatus may be arranged in such a way that the satellite sensors output a signal of level 1, 2, or 3 according to increase in the impact, for example, areas are set according to the respective levels (see FIG. 7A and FIG. 7B), the air bag system is not activated when the relation of arithmetic value f(G) against speed v is in the area of level 1, the air bag system is activated based on the outputs from the both sensors of the satellite sensors and floor sensor when the relation is in the area of level 2, and the air bag system is directly activated when the relation is in the area of level 3.

In the above-described embodiment the determination on whether the on signal from the satellite sensors should be ignored is carried out based on the predetermined area determined according to the relation of arithmetic value f(G) against speed v, but, without having to be limited to this, the determination on whether the on signal from the satellite sensors should be ignored may also be conducted based on V (=∫Gdt), filter G, and arithmetic value f(G).

As described above, the apparatus of the invention is arranged so that the threshold alteration disabling means disables lowering of the threshold by the threshold altering means when the value obtained based on the measured value is smaller than the predetermined value, whereby the passive safety device can be prevented from being activated during the non-crash period.

Since the threshold setting means sets the threshold for controlling the activation of the passive safety device on the basis of the value obtained based on the measured value by the impact measuring means and the value obtained based on the detected value by the impact detecting means, the prevention of activation of the passive safety device can be accurately performed during the non-crash period.

Since the threshold-alteration-amount adjusting means adjusts the predetermined amount of threshold altered by the threshold altering means, according to the value based on the measured value by the impact measuring means, the determination on the crash can be performed using the threshold of appropriate value and the prevention of activation of the passive safety device can be accurately performed during the non-crash period.

Since the predetermined amount of the threshold altered by the threshold altering means is set to zero when the determining means determines that the value based on the measured value by the impact measuring means is smaller than the predetermined value, the determination on the crash is carried out using the high threshold and thus the prevention of activation of the passive safety device can be accurately performed during the non-crash period.

As detailed above, the controlling apparatus of air bag BG has the first sensor 32 mounted on the vehicle 46, the second sensor 30 mounted in the front part of the vehicle 46 before the first sensor 32, and the controlling circuit 20 for controlling the air bag BG according to the outputs from the first and second sensors 32, 30, and the controlling circuit 20 controls the air bag BG in such a way that (a) the air bag BG is inflated when the impact detected by the first sensor 32 is greater than a first value, (b) the air bag BG is inflated even through the impact detected by the first sensor 32 is smaller than the first value, when the impact detected by the second sensor 30 is greater than a second value and when the impact detected by the first sensor 32 is greater than a third value, and (c) the air bag BG is not inflated when the impact detected by the second sensor 30 is greater than the second value and when the impact detected by the first sensor 32 is smaller than a predetermined value, even if the condition of (b) is satisfied within the predetermined time thereafter.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An activation controlling apparatus for passive safety device comprising:

impact measuring means mounted at a predetermined position in a vehicle, for measuring an impact exerted on the vehicle;

activation controlling means for comparing a value obtained based on a measured value by said impact measuring means with a threshold and for controlling activation of a passive safety device, based on a result of the comparison;

impact detecting means mounted ahead of said impact measuring means in said vehicle, for detecting whether an impact not less than a predetermined reference value is exerted on said vehicle; and threshold altering means for lowering the threshold when said impact detecting means detects the impact not less than said reference value, said activation controlling apparatus for passive safety device comprising:

determining means for determining whether the value obtained based on the measured value by said impact measuring means is smaller than a predetermined value, when said impact detecting means detects the impact not less than said reference value; and threshold alteration disabling means for disabling said threshold altering means from lowering the threshold when said determining means determines that the value obtained based on said measured value is smaller than said predetermined value.

2. An activation controlling apparatus for passive safety device comprising:

impact measuring means mounted at a predetermined position in a vehicle, for measuring an impact exerted on the vehicle;

activation controlling means for comparing a value obtained based on a measured value by said impact measuring means with a threshold and for controlling activation of a passive safety device, based on a result of the comparison;

impact detecting means mounted ahead of said impact measuring means in said vehicle, for detecting an impact exerted on the vehicle; and threshold setting means for setting said threshold on the basis of the value obtained based on the measured value by said impact measuring means and a value obtained based on a detected value by said impact detecting means.

3. The activation controlling apparatus for passive safety device according to claim 2, wherein said threshold setting means comprises threshold altering means for altering said threshold by a predetermined amount when said impact detecting means detects an impact not less than a reference value, and threshold-alteration-amount adjusting means for adjusting said predetermined amount according to the value based on the measured value by said impact measuring means.

4. The activation controlling apparatus for passive safety device according to claim 3, wherein said threshold-alteration-amount adjusting means has determining means for determining whether the value based on the measured value by said impact measuring means is smaller than a predetermined value, and wherein said threshold-alteration-amount adjusting means sets said predetermined amount to zero when said determining means determines that the value based on said measured value is smaller than said predetermined value.

5. An apparatus for controlling an air bag, comprising:

a first sensor mounted on a vehicle;

a second sensor mounted ahead of said first sensor in said vehicle; and a control circuit which controls the air bag according to the outputs from said first and second sensors, wherein said control circuit controls said air bag in such manner that:

(a) the air bag is inflated when an impact detected by said first sensor is greater than a first value;

(b) the air bag is inflated even if the impact detected by said first sensor is smaller than the first value, when an impact detected by said second sensor is greater than a second value and when the impact detected by the first sensor is greater than a third value; and (c) said air bag is not inflated when the impact detected by the second sensor is greater than the second value and when the impact detected by said first sensor is smaller than a predetermined value, even if the condition of (b) is satisfied thereafter.

6. An activation controlling apparatus for passive safety device comprising:

impact measuring means mounted at a predetermined position in a vehicle, for measuring external force exerted on the vehicle;

impact detecting means mounted ahead of said impact measuring means in said vehicle, for detecting whether the external force exerted on said vehicle is not less than a predetermined reference value; and means for controlling activation of the passive safety device based on a result of a comparison between a first value and a threshold value, said first value being based on a measured value measured by said impact measuring means, said threshold value being altered based on the measured value measured by said impact measuring means when said impact detecting means detects the impact not less than the predetermined reference value.

7. The activation controlling apparatus for passive safety device according to claim 6, wherein said alternation is a decrease in said threshold value.

8. The activation controlling apparatus for passive safety device according to claim 7, wherein the decrease in said threshold value is smaller when the measured value measured by said impact measuring is small.

9. The activation controlling apparatus for passive safety device according to claim 7, wherein said impact detecting means comprises an electronic satellite sensor for measuring the external force exerted on the vehicle.

10. The activation controlling apparatus for passive safety device according to claim 9, wherein the decrease in said threshold value is smaller when the measured value measured by said electronic satellite sensor is small.

11. An activation controlling apparatus for passive safety device comprising:

impact measuring means mounted at a predetermined position in a vehicle, for measuring external force exerted on the vehicle and generating a signal representing that force;

an electronic satellite sensor mounted ahead of said impact measuring means in said vehicle, for measuring external force exerted on the vehicle and generating a signal representing that force; and means for controlling activation of a passive safety device such that:

when a relationship between the signal generated by said impact measuring means and a velocity derived from this signal satisfies a first condition, the passive safety device is not activated;

when the relationship satisfies a second condition, the activation of said passive safety device is further depends on the signals from said impact measuring means and said electronic satellite sensor;

when the relationship satisfies a third condition, the passive safety device is activated; and said first, second and third conditions are defined based on the signal from said electronic satellite sensor.

* * * * *